C. H. CAMPBELL.
DESICCATING MILK.
APPLICATION FILED NOV. 2, 1907.

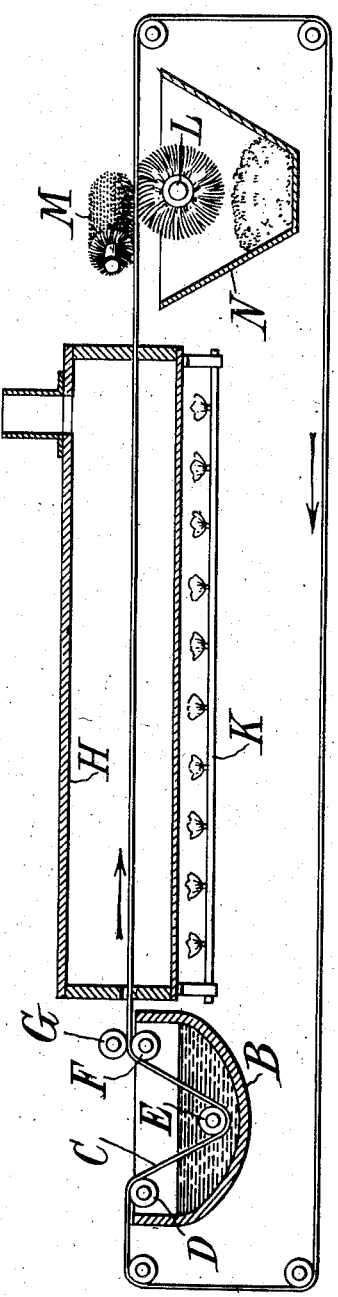
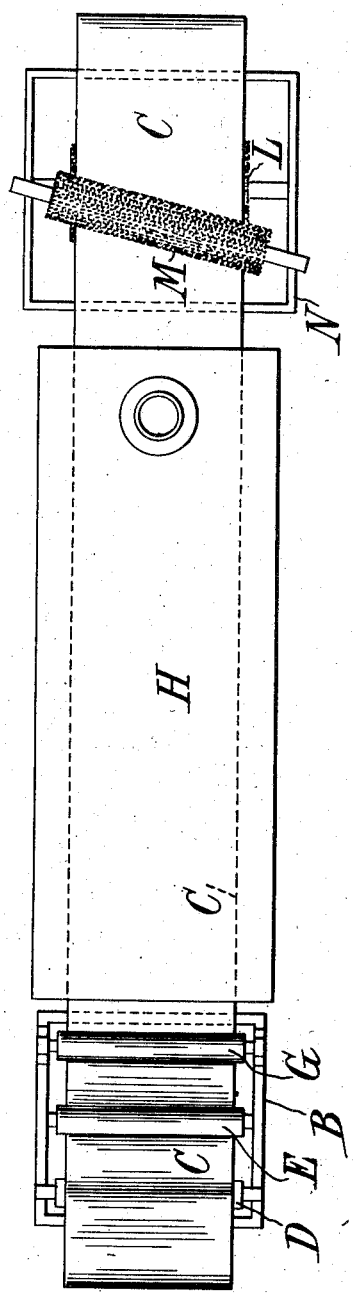

1,015,262.

Patented Jan. 16, 1912.

3 SHEETS—SHEET 2.

WITNESSES:

INVENTOR:
Charles H. Campbell,
By Attorneys

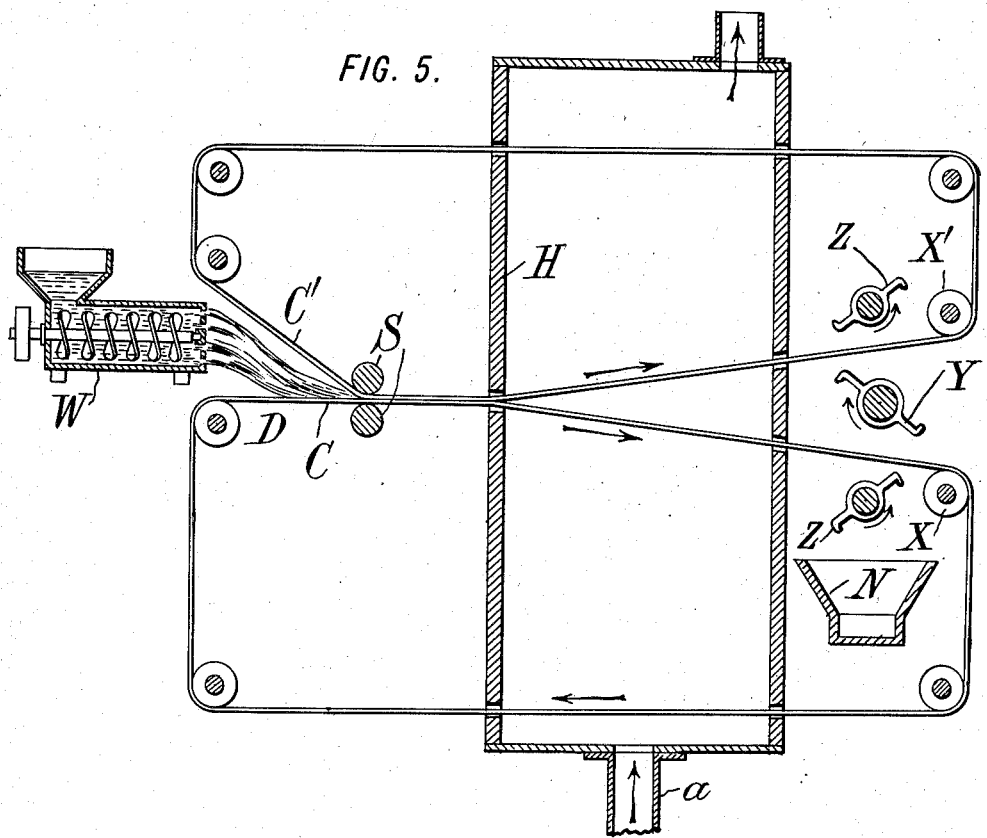
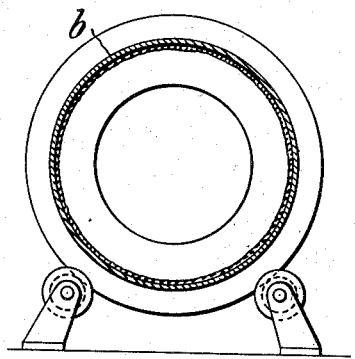
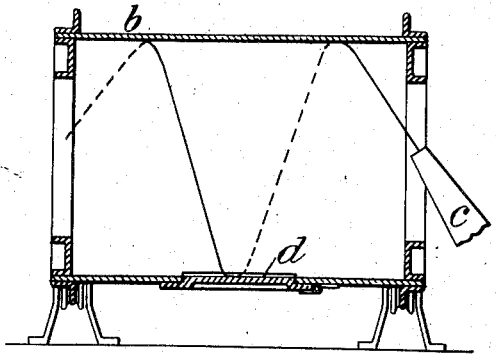

UNITED STATES PATENT OFFICE.

CHARLES H. CAMPBELL, OF NEW YORK, N. Y.

DESICCATING MILK.

1,015,262.  Specification of Letters Patent.  Patented Jan. 16, 1912.

Application filed November 2, 1907. Serial No. 400,333.

*To all whom it may concern:*

Be it known that I, CHARLES H. CAMPBELL, a citizen of the United States, residing in the borough of Manhattan, city, county, and State of New York, have invented certain new and useful Improvements in Desiccating Milk, of which the following is a specification.

This invention aims to provide improvements in the desiccation of skim milk or whole milk or similar liquids containing small percentages of solids; and aims especially to effect a rapid elimination of the last remaining moisture in the product, and to obtain a light, loose product. To this end the milk, preferably after partial concentration, is formed into a film, and the remaining moisture is extracted from it while in this shape, so that it is converted at once into a light powder which is substantially the same as when it was dissolved or suspended in the original milk. Preferably the original concentration is performed with the assistance of heat below the coagulating point of albumen. The concentrated milk, before it loses any of the warmth of the first concentration (or, where this is impracticable, after being subjected to a further warming), is then spread into a film, so that the warmth therein has a material effect in hastening the evaporation of the remaining moisture. The film may contain so little water as to permit its extraction by merely running it slowly through the open air; but preferably it is run through an oven or drier in which either the heat or a current of air, dry and preferably warm, extracts the remaining moisture. The film is preferably carried upon a belt, and after the moisture is extracted the remaining powder is beaten, scraped, brushed, or otherwise removed from the belt.

The accompanying drawings illustrate more or less diagrammatically several embodiments of the invention.

Figure 3:
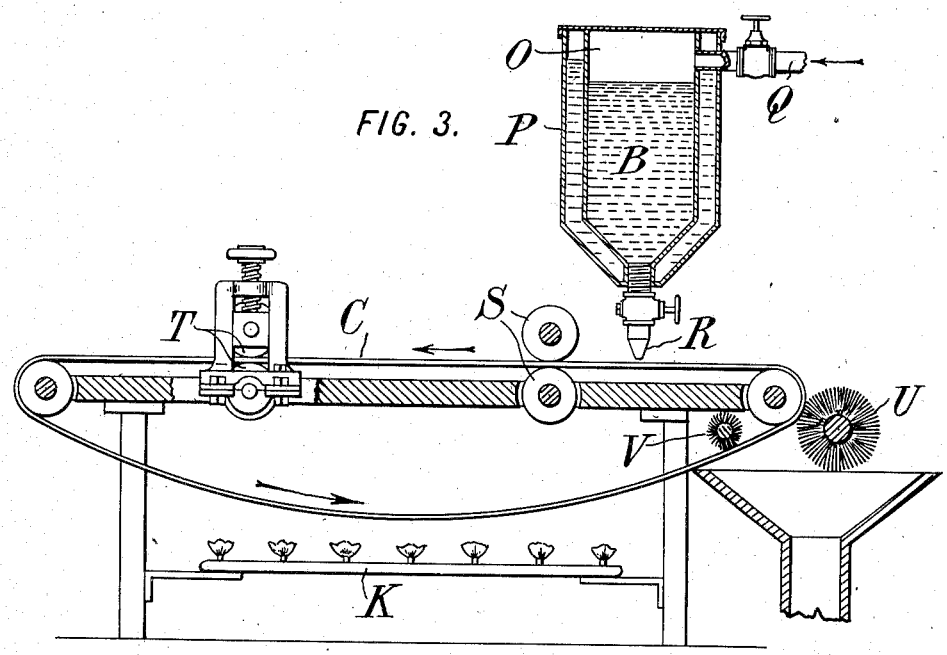
Figure 4:
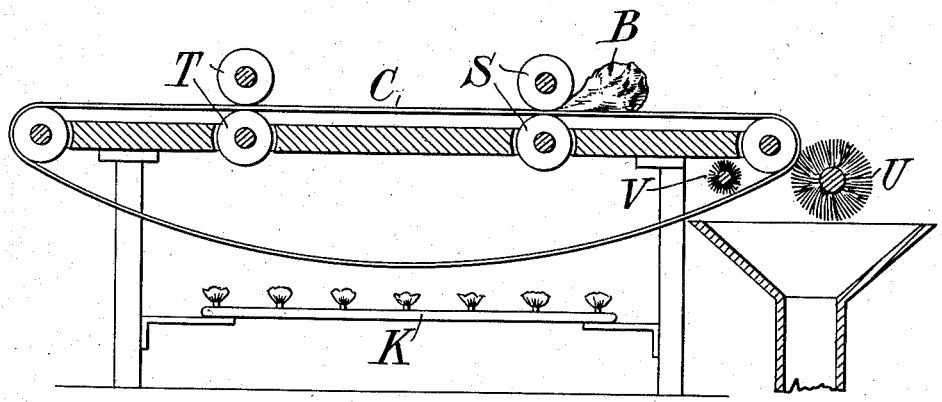

Figures 1 and 2 represent in vertical section and in plan mechanism for carrying out a process. Figs. 3, 4 and 5 are vertical sectional views illustrating modified mechanism for carrying out other processes embodying the invention. Fig. 6 is a cross-section, and Fig. 7 a longitudinal section, illustrating a mechanism for carrying out another process embodying the invention.

Referring first to Figs. 1 and 2, the body of milk A is partially concentrated and introduced into a vessel B and maintained at a suitable level therein. Through this vessel B runs a continuous belt C which is preferably of thin sheet steel or other metal, but which may be of textile material or of any other suitable fabric. The belt C passes over suitable guide rollers D, E, F to take up a coating of milk. Preferably a pressure roller G is arranged to engage the belt opposite the roller F so as to spread the milk in a very thin layer upon the belt, the existence or absence of the roller G, or its adjustment, being determined by the degree of preliminary concentration before the introduction of the milk into the tank B. From the tank the belt runs very slowly through an oven H of any suitable construction, and typified as a simple rectangular box with a gas heating pipe K underneath. When the belt emerges from the oven H the moisture thereon will all have been dissipated, and the solid matter will be left in the same finely divided and lightly distributed form as in the original milk, so that when it is replaced in water it will be very readily dissolved or suspended in the same manner as originally. For the removal of the product from the belt, a pair of brushes are shown, the underneath brush L being arranged at right-angles to the belt, and the upper brush M being arranged obliquely so as to force the material over the side of the belt. The material from both sides of the belt falls into a hopper N. After removal of the product the belt is returned over suitable guide pulleys to the tank B.

In Fig. 3 the partially concentrated milk B is carried in a vessel O provided with a water jacket P by which the milk may be kept at any desired temperature. The vessel is covered, and provided with a pipe Q through which compressed air may be introduced to force the milk in a thin stream through the slitted nozzle R upon the belt C. The belt is carried in the direction of the arrow by means of rollers S, which at the same time spread the milk as thinly as desired. Or, if the milk is originally very thick, the film may be thinned in two stages, using a second pair of rollers T, preferably adjustable as shown, for the purpose. Instead of an inclosed oven the drying may be effected by simply passing the belt over a gas pipe K provided with a suitable number of jets. The removal of the powder from the belt will be effected by means of a brush U on the outer face; and, if a textile material through which the milk could pass, were used, a second brush V would be provided on the inner side of the belt.

The first stage of the process may be continued to a point beyond that at which the milk flows so readily as to pass through a nozzle in the manner of Fig. 3, or to be taken up from a vessel in the manner of Fig. 1. In this advanced stage, the solids of the milk are quite sticky, and it assumes a doughy condition. In this condition it may be manipulated as in Fig. 4 with a lump of concentrated milk B being held by the operator against the upper roller S, which feeds it in a comparatively thin film upon the belt; this film being further thinned if desired by means of additional rollers T.

The doughy material may be fed by machinery to the mechanism which converts it into a film. For example, in Fig. 5, such a machine is shown in combination with a different style of film-forming apparatus. A sort of pug-mill W expresses the thickly concentrated milk D between a pair of belts C C' arranged to be pressed toward each other by means of rollers S. The belts carry a certain quantity of milk between them, and stick to each other by reason of the nature of the milk, although the belts run from the rollers S to separated rollers X X'. From the point of feed the belts run into an oven H heated by hot air admitted through the pipe a. The angle which the belts make with each other becomes so great that they pull apart and pass separately through the oven, the milk on each belt being well exposed to the heat. In the construction shown in this figure the belts are arranged to run twice (that is, on their forward and their backward lengths) through the oven, so that they will be in a somewhat heated condition when the milk is applied to them, and the desiccation will thus be hastened.

Cream may be mixed in any desired proportions in the original milk, or may be added to the milk after concentration and before spreading into a film. Instead of the oven or driers illustrated, there may be substituted a current of hot, dry air as described in patent of Joseph H. Campbell and myself No. 668,162. The brushes may be of steel or of fiber, or they may be substituted by scraping knives or the like. Where they are used on both sides of a belt they are preferably arranged opposite to each other so as to provide a support for the belt. Instead of the brushes or scrapers referred to, the dried product may be removed by simply beating or shaking the belt as by the outside beater Y and inside beaters Z (Fig. 5), this method having the advantage of avoiding lint or scrapings of metal or the like in the product. The film is not necessarily carried on a continuous belt. It may, for example, be formed upon sheets or the like which are dipped in the tank of milk and are then hung in a drying room over night. The dipping of the sheets, or the application of milk to the belt or the like, may be repeated if necessary to obtain a film of sufficient thickness. From such sheets the material may best be removed by beating or shaking.

In using the drum b of Figs. 6 and 7, the drum is rotated slowly, and milk of a suitable consistency introduced in such a quantity that in the rotation of the drum the milk will be spread out in a thin film over substantially the entire inner surface. A jet of dry warm air will be introduced through a nozzle c in such a manner as to maintain a drying atmosphere within the cylinder, the air preferably circulating in approximately the manner indicated by the spiral line. When substantially all the remaining moisture has been dried out of the milk, it will be scraped or otherwise removed into the bottom of the cylinder, and withdrawn through a hinged gate d.

What I claim is:—

The process of converting milk into a light powder which consists in preliminarily partially concentrating it and subsequently forming it into a film on a flexible traveling support, limiting the thickness of the film by a member at a substantially fixed distance from the support, extracting the remaining moisture from such film, and removing the product by heating or shaking said support.

In witness whereof, I have hereunto signed my name in the presence of two subscribing witnesses.

CHARLES H. CAMPBELL.

Witnesses:
 DOMINGO A. USINA,
 THEODORE T. SNELL.